United States Patent
Balasubramanian et al.

(10) Patent No.: US 7,703,133 B1
(45) Date of Patent: Apr. 20, 2010

(54) SECURE AUTHENTICATION CURTAIN SYSTEM AND METHOD

(75) Inventors: Balagurunathan Balasubramanian, Irving, TX (US); Rudi Himawan, Grand Prairie, TX (US); Shrikant D. Jannu, Frisco, TX (US); Richard Perez, Euless, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1159 days.

(21) Appl. No.: 11/311,030

(22) Filed: Dec. 16, 2005

(51) Int. Cl.
*G06F 21/22* (2006.01)
(52) U.S. Cl. .................................. 726/17; 713/164
(58) Field of Classification Search .............. 713/2; 726/16, 17, 26, 27
See application file for complete search history.

(56) References Cited

U.S. PATENT DOCUMENTS

| | | | | |
|---|---|---|---|---|
| 6,020,886 A | * | 2/2000 | Jacober et al. | 715/709 |
| 6,144,959 A | * | 11/2000 | Anderson et al. | 707/9 |
| 6,651,171 B1 | * | 11/2003 | England et al. | 713/193 |
| 7,076,713 B1 | * | 7/2006 | Hess | 714/741 |
| 2002/0184623 A1 | * | 12/2002 | Hodge et al. | 725/37 |

OTHER PUBLICATIONS

Balasubramanian, Balagurunathan, et al., "Call Center Dashboard," filed Oct. 7, 2004, U.S. Appl. No. 10/960,535, Specification (41 pgs.) and Drawings (13 sheets).
Himawan, Rudi, et al., "Single Sign-on System and Method," filed Nov. 22, 2004, U.S. Appl. No. 10/994,997, Specification (32 pgs.) and Drawings (3 sheets).

* cited by examiner

*Primary Examiner*—Gilberto Barron, Jr.
*Assistant Examiner*—Simon Kanaan

(57) ABSTRACT

A system for preventing a user from interrupting a script launching one or more applications on a computer is provided. The system comprises a script operable to promote launching one or more applications. The system also comprises a security curtain application operable to prevent the user's input from interfering with operation of the script. The system further comprises enabling and disabling the security curtain application based upon one or more triggering events.

19 Claims, 4 Drawing Sheets

SECURE AUTHENTICATION CURTAIN SYSTEM AND METHOD

CROSS-REFERENCE TO RELATED APPLICATIONS

This application contains subject-matter related to U.S. patent application Ser. No. 10/960,535, entitled CALL CENTER DASHBOARD, filed Oct. 7, 2004 by Balagurunathan Balasubramanian et al., and U.S. patent application Ser. No. 10/994,997, entitled SINGLE SIGN-ON SYSTEM AND METHOD, filed Nov. 22, 2004 by Rudi Himawan et al., both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a system and method for preventing interruption of an operation of an application by a user, and more particularly, but not by way of limitation, to a secure authentication curtain system and method.

BACKGROUND OF THE INVENTION

A lack of workplace productivity inflicts significant loss of corporate earnings. Companies often struggle with how to improve employee productivity and the productivity of the entities that conduct business. Some methods for improving corporate productivity include empowering employees with tools to conduct business at multiple locations. For example, some corporations may provide employees with computers to enable employees to perform job functions such as responding to email, analyzing data, providing customer support, and/or other job related functions. Other methods for improving corporate productivity include implementation of systems that prevent workplace related errors, which may disrupt the continuity of business.

SUMMARY OF THE INVENTION

An embodiment of the present disclosure is a system for preventing a user from interrupting a script launching one or more applications on a computer is provided. The system comprises a script operable to promote launching one or more applications. The system also comprises a security curtain application operable to prevent the user's input from interfering with operation of the script.

In an embodiment, a method of preventing interruption by a user of a script launching applications is provided. The method comprises running the script that launches applications on the user's computer. The method also comprises launching a security curtain application adapted to prevent user input from interrupting the applications launching on the computer.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1A:
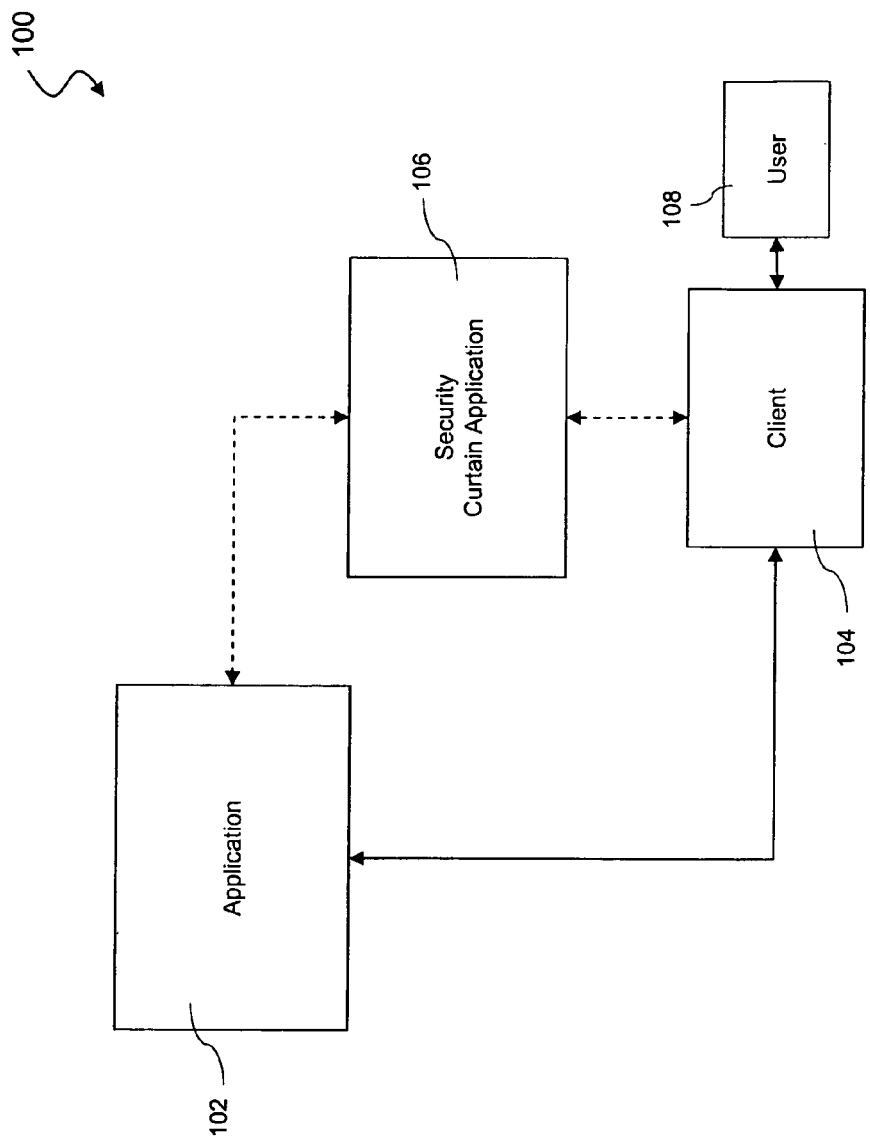
FIG. 1a is a block diagram of an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

As used herein, the term computer may refer to a device capable of processing information to produce a desired result, or a device that accepts data and manipulates it for some result based on a sequence of instructions, which describes how data is to be manipulated or processed. The term data store may refer to various computer-based storage systems, and/or applications such as relational databases, directories, and other storage systems. The term application may refer to a computer program or several cooperating computer programs. Multiple instances of an application may execute on a plurality of servers, for example to provide increased processing capacity. The term business interruption may refer to a loss of productivity, for example inexperienced users interfering with boot-up scripts and/or other applications on a computer by keying in random strokes on an input device. The term script may refer to a set of computer-based commands for automating one or more tasks, such as data entry into graphical user interfaces (GUI) or windows by simulating user typed commands.

Large corporations are constantly struggling to improve workplace and employee efficiency. Corporations implement multiple systems and methods for improving ways to conduct business. Corporations may also implement systems and methods for improving corporate productivity by reducing business interruptions. Such interruptions often result in a loss of employee or business system productivity and a loss in corporate earnings.

Some organizations may have large networks with many computers used by many users, such as customer support representatives of a telecommunications company. The computers may include an application that may be adapted for conducting call center business activities such as a call center dashboard (CCDB) described in the application(s) that are incorporated herein by reference above. The CCDB application or system may provide access to one or more applications employed by a plurality of users for providing business support services and/or other services. As the computers boot-up, scripts and/or other automated processes may be launched in the CCDB system. The scripts and/or other automated processes may launch one or more applications for providing virus protection, user login and authentication, specific user settings, database management, customer service support, and/or other operations or applications that may be employed by the users. In some instances, for example, the users or customer support representatives may intentionally or unintentionally interfere with the scripts so that the computer does not boot-up or properly load applications. These and other types of interruptions create business interruptions by preventing computers from properly loading or initializing, which may prevent the users from being able to use the system or application.

Accordingly, the present disclosure provides a secure curtain or system to prevent the user from intentionally or unintentionally interfering with the initiation and/or login processes on their computers. Questions concerning failed application launch or system boot-up are typically directed to the enterprise's technical support staff, which may create an even great burden on enterprise resources and further reducing efficiency and raising the costs of such interruptions.

Turning now to FIG. 1a, a system 100 for preventing such business interruption is depicted. The system 100 includes an application 102 in communication with a client 104 and a security curtain application 106.

The client 104 may include one or more data stores, and/or other computer-based entities. The client 104 as well as other systems discussed herein may be operable on a general-purpose computer, which is discussed hereinafter in greater detail. The application 102 may be located on a server and/or or may include operable portions located on the client 104 in some embodiments. The client 104 may also be in communication with or accessible by a user 108.

The application 102 may be located on the client 104 or may be located on a remote or other server or system in other embodiments. The application 102 may include one or more applications, and/or scripts that may be adapted for conducting one or more operations.

In an embodiment, the application 102 may include a call center dashboard (CCDB) application and/or other applications adapted for conducting business. The CCDB application or system may provide access to one or more applications employed by a plurality of users for providing business support services and/or other services, which may be performed by a call center business entity. The application 102 may provide authentication services for access to business information such as customer records and receipts. The application 102 may also provide the client 104 access to product specifications, troubleshooting procedures, and/or other business support information. The application 102 may be a script, batch file, or other program or routine to launch or load other applications or provide automation for functions such as user login or authentication, and or other functions that may be employed during initial start-up of the user's computer system and it's resident applications. In an embodiment, the script may include a windows scripting host (WSH) to create a web browser window used for these purposes.

The security curtain application 106 may communicate with the application 102 and the client 104 for selected operations and/or time intervals designated by the application 102 and/or other entities. The security curtain application 106 may be located on the client 104 or on a remote server. In an embodiment, the security curtain application 106 may be launched by or integrated into the application 102. The security curtain application 106 may also be incorporated into other applications located on the client 104 and/or other entities.

In an embodiment, the security curtain application 106 may assist boot-up, login, and/or other scripts from being interfered with by the user 108. That is, when the client 104 or computer is initially turned on, or during a login operation the security curtain application 106 may be employed to prevent the user from interfering with scripts that launch various applications. For example, scripts may be used to launch various applications for use by customer service representative to assist customers. The scripts may automate the login procedure by automatically filling-in or providing user name, password and/or other or additional information to the application being launched. Accidental or intentional input by the user at certain times during application initialization might interfere with the application loading properly. The secure curtain application 106 prevents user input from interrupting applications during boot-up or initialization.

In some embodiments, the security curtain application 106 may include a web browser, a windows scripting host, and/or other applications. For example, the security curtain application 106 may include a web browser, which may in some embodiments have disabled inputs, that resides in the foreground over the application 102. The user 108 associated with the client 104 may be prevented from accessing the application 102 since the security curtain application 106 resides in the foreground. Therefore, when the user 108 attempts to utilize an input device such as a keyboard or mouse the application 102 or script may not respond to user input and will continue to operate uninterrupted. The security curtain application 106 may also include a windows scripting host (WSH) to create a web browser window used for these purposes. Alternatively, the security curtain application 106 may include a splash screen, a blank white colored screen, and/or other window substantially covering a visual output associated with the client 104. The security curtain application 106 may also include one or more instructions to disable input devices such as a keyboard, a mouse, a trackpad, a microphone, and/or other input devices. Although, disabling input devices may not be preferred since if the client 104, the application 102, the security curtain application 106, and/or a remote server hangs-up or stalls, in some instances it may be difficult to get the input devices to start working again.

In an embodiment, the security curtain application 106 may include one or more windows or splash screens that provide information while the security curtain application 106 operates to prevent input to the application 102. The security curtain application 106 may provide news, video, images, and/or other media to the client 104. For example, the security curtain application 106 may provide a window where information is displayed such as training information, company news, reports, email, and/or other information. Alternatively, the security curtain application 106 may also provide a screen completely covering the computer screen that may display information such as news, video, images, and/or other media. The users may be less likely to intentionally or unintentionally interrupt the scripts since the users cannot see the script because it is running behind a screen in the foreground that is displaying new or other information, for example.

In another embodiment, the security curtain application 106 includes a monitoring component to detect when user 108 input from the client 104 may be accepted according to operational aspects of the applications 102. For example, the application 102 may activate the security curtain application 106 during critical operations such as system boot-up and/or authentication to prevent user interference. The application 102 may also include a script to launch one or more applications. The script may automatically fill-in user name, password, and/or other information to complete a login operation to launch one or more applications to simplify the login process, to standardize passwords, to implement increased security, or for other reasons. The security curtain application 106 prevents the user 108 from interfering with the script and/or boot-up. In certain instances, user input may be necessary or useful. Consequently, the monitoring component may determine the time when the security curtain application 106 may be deactivated, and therefore allowing the user 108 of the client 104 access to inputs associated with the application 102. Alternatively, the security curtain application 106 and/or application 102 may include one or more timed events or triggering events that activate and/or deactivate the security curtain application 106.

In an embodiment, the security curtain application 106 may also include a timer to deactivate the security curtain application 106 after the expiration of a certain amount of time. This may be useful in cases where the application 102, script, or loading applications fail to load properly or hang-up during launch. For example, if the application 102 encounters an operation error and locks-up the computer, a timer which may have started before the application 102 was launched will eventually expire and deactivate the security curtain application 106. The user may then make any inputs necessary to restart the computer or prompt the application 102 to start running again. In some embodiments, the security curtain application 106 may also disable the device inputs during prior to, during, and/or following the activation of the timer.

The security curtain application 106 may be employed in a myriad of environments where it is useful to prevent the user 108 input, whether accidental or intentional, from interfering with scripts or other systems launching or booting-up applications or systems.

Figure 1B:
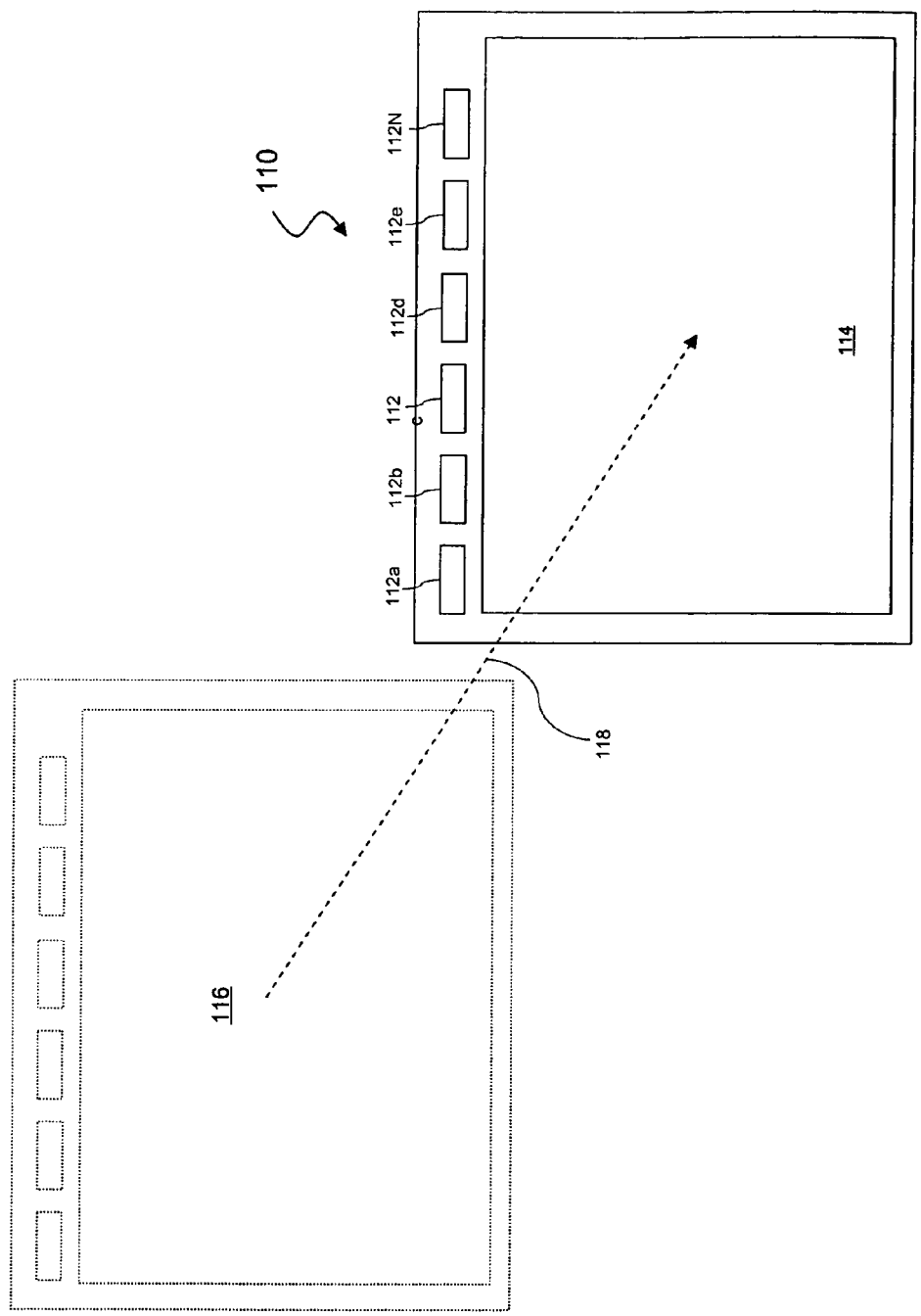
FIG. 1b is a block diagram of one embodiment of the present disclosure.

Turning now to FIG. 1b, a block diagram depicts an embodiment of the present disclosure. The application 102 may operate via a graphical user interface (GUI) 102. The client 104 may include the GUI 110 to access and/or operate aspects of the application 102 and/or the security curtain application 106. The GUI 110 may operate on a general-purpose computer, a mobile device, and/or other device. The GUI 110 may include a web browser, and/or other customized user interface. The GUI 110 may also be adapted for implementing one or more functions or operations associated with the application 102. The GUI 110 includes buttons 112a, 112b, 112c, 112d, 112e, . . . 112N, and the viewing area 114.

In an embodiment, a curtain screen 116 may be formed by the security curtain application 106. The curtain screen 116 may include a screen that disables the buttons 112a, 112b, 112c, 112d, 112e, . . . 112N and/or other input devices associated with the client 104. The curtain screen 116 may also include web browser window or graphical screen that overlays the GUI 110 (as shown by line 118). The curtain screen 116 may also be non-movable or non-minimizable by the user 108, and may not include any features or may include other disabled buttons such as window scroll bars. The curtain screen 116 may also include a splash screen or a blank colored screen that partially or substantially overlays the GUI 110. The curtain screen 116 may include text-based information, hypertext markup language (html), video, audio, and/or other media while active. The curtain screen 116 may be activated by the security curtain application 106 and/or the application 102. In some embodiments, the application 102 may activate the curtain screen 116 during authentication operations and/or other operations. The curtain screen 116 may also be activated according to timers and or other triggering events associated with one or more operational aspect of the application 102, the security curtain application 106, and/or the client 104. The curtain screen 116 may also be deactivated by a timer, that may be activated in the event of one or more errors associated with the application 102. For example, the curtain screen 116 may be disabled if the application freezes or encounters and operational error.

In some embodiments, the curtain screen 116 may be activated and/or deactivated by a myriad of calls associated with the application 102. The curtain screen 116 may also be activated and/or deactivated by authorized users such as a system administrator.

Figure 2:
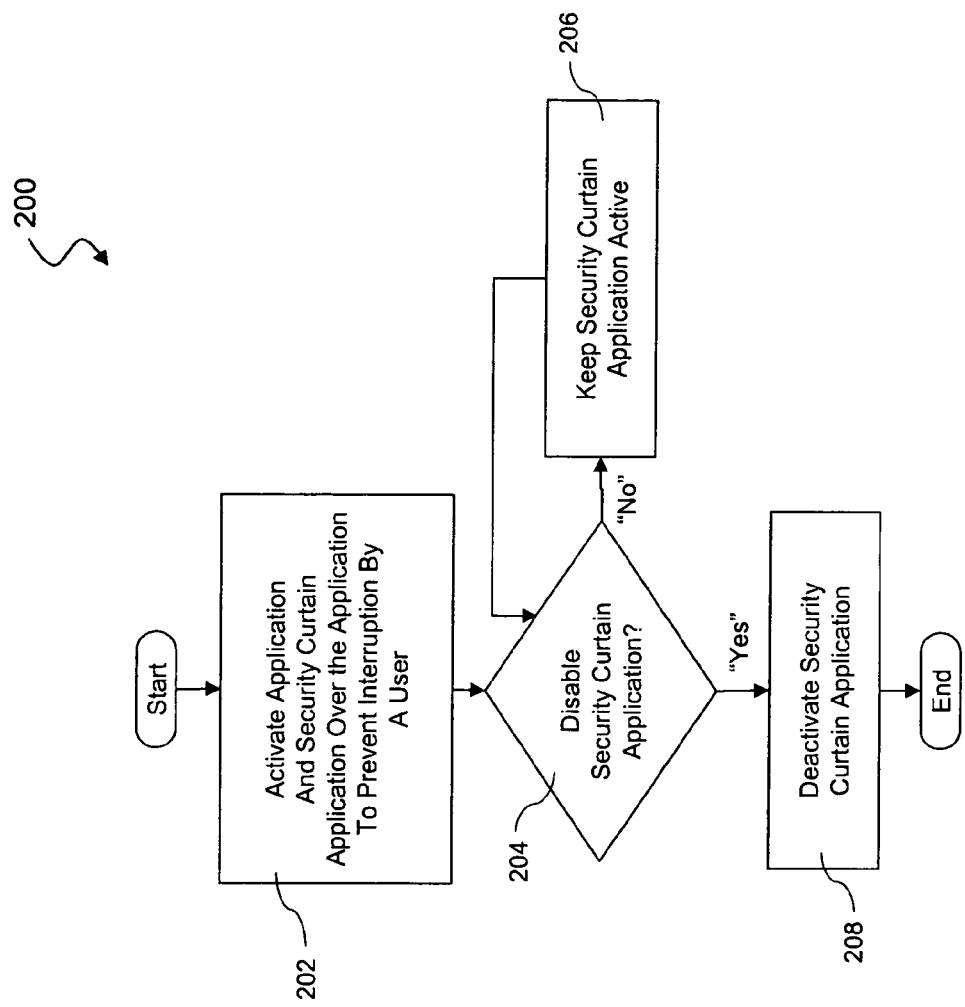
FIG. 2 is a flow diagram of a method for preventing interruption of an operation of an application by a user according to one embodiment of the present disclosure.

Turning now to FIG. 2, a flow diagram depicts a process 200 for preventing an interruption of an operation of the application 102 by the user 108. In block 202, the application 102 may be activated on the client 104 or on a remote server (not shown). The security curtain application 106 may be activated by the application 102. The security curtain application 106 may include or create the curtain screen 116 to prevent interruption of operational aspects of the application 102 by the user 108.

The process flows to block 204 to decide whether to disable the security curtain application 106. The application 102 may provide a triggering event to the security curtain application 106 to disable the curtain screen 116. Alternatively, a timer may disable the security curtain application 106.

In block 206, if the trigger event does not occur, the security curtain application 106 may remain active. In block 208, if the trigger event does occur, the security curtain application 106 may be deactivated and thus allowing the client 104 access to associated inputs of the application 102. The process then ends. Of course, it is to be understood that the blocks 202 through 208 may be executed sequentially or in parallel by the system 100 or in different order than illustrated.

The system 100 and method 200 described above may be implemented in a computer-based environment wherein multiple windows may be present, and where typically one window may be active for keyboard, mouse, and/or other input devices. The system 100 provides placing the curtain screen 116 window over other background windows and making the curtain screen 116 window the active window for keyboard, and/or mouse input. Consequently, device input from the user 108 is directed into the curtain screen 116 window where such input provides no negative impact to the operation of the application 102, whereas generally such input may interfere with the activity of the application 102 or script. Since background windows are not visible to the user 108, the user 108 may not use the mouse to change the active window. Additional or alternative features may of course enhance the responsiveness of comprehensiveness of this approach. In some embodiments, the curtain screen 116 window may be set to always remain on top, even if background requestor windows might otherwise pop-up during the operation of the application 102 or script. The GUI 110 may include window tools, which may be normally employed for window re-sizing and/or movement disabled to prevent the user 108 from gaining access to background windows of the application 106 or script while the curtain screen 116 window is active. Alternatively, inputs from keyboard and/or mouse may be temporarily disabled. If the curtain screen 116 did not cover the entire screen, the curtain screen 116 may cover windows that may need to be protected from input by the user 108. If background windows associated with the operation of the application 102 were exposed, the mouse and/or keyboard may be temporarily disabled to prevent the user 108 from exposing background windows. While this example is discussed in terms of a Microsoft windows-based environment, the same principles could equally apply to other GUI-enabled multi-tasking operating systems as would be understood by those skilled in the art.

Figure 3:
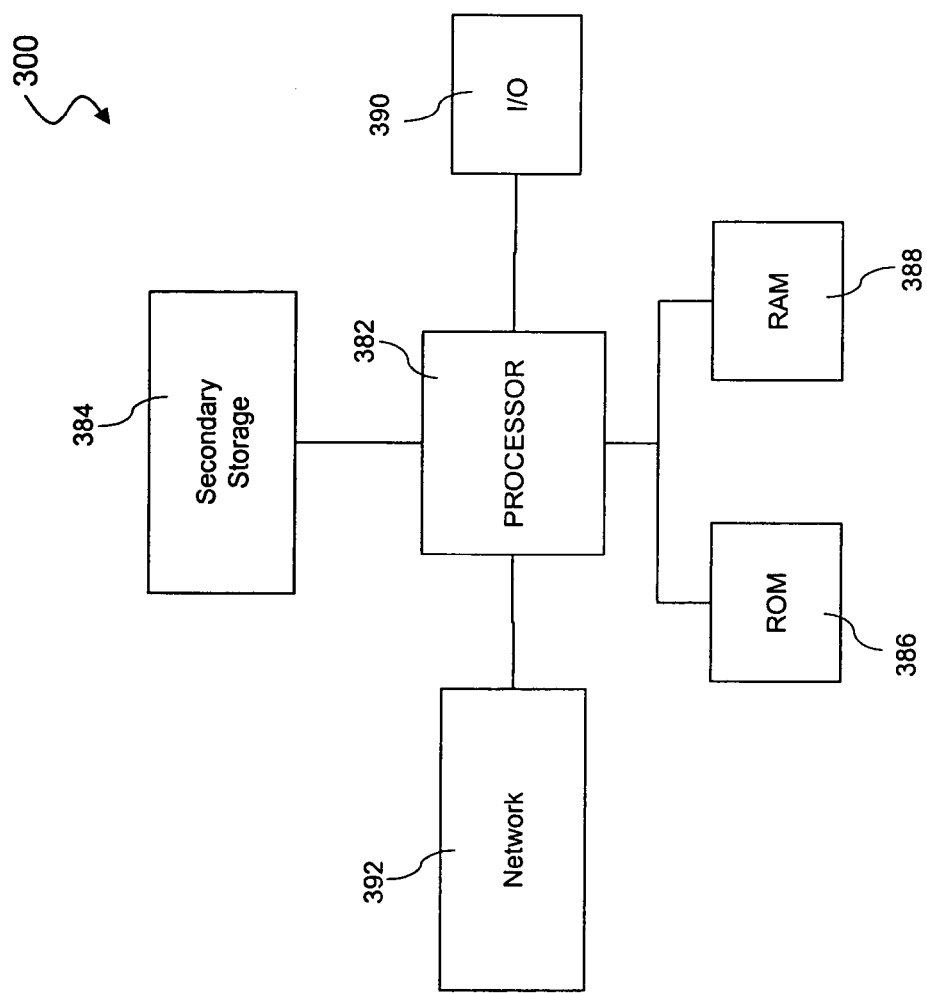
FIG. 3 illustrates an exemplary general-purpose computer system suitable for implementing the several embodiments of the present disclosure.

The system 100 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. At least one computer readable storage medium storing at least one program which, when executed by a processor, prevents a user from interrupting a script launching one or more applications on a computer, the at least one program comprising:
    a script operable to promote launching one or more applications; and
    a security curtain application operable to prevent the user's input from interfering with operation of the script, wherein the security curtain application further comprises a monitoring component which controls when the user may provide input to the one or more applications during the operation of the script.

2. The at least one computer readable storage medium of claim 1, wherein the script is a graphical user interface entry that simulates user keyboard input into requestor windows.

3. The at least one computer readable storage medium of claim 1, wherein the security curtain application is operable to receive and ignore user keyboard and mouse input to prevent the user from interrupting a security aspect of the application being loaded on the computer.

4. The at least one computer readable storage medium of claim 1, wherein the security curtain application operates for a pre-determined time.

5. The at least one computer readable storage medium of claim 1, wherein the security curtain application comprises a web browser having one or more disabled inputs.

6. The at least one computer readable storage medium of claim 1, wherein the security curtain application further operates to provide a screen substantially encompassing a viewing output associated with the one or more applications.

7. The at least one computer readable storage medium of claim 1, wherein the monitoring component allows user input to the one or more applications at controlled steps or times.

8. The at least one computer readable storage medium of claim 1, wherein the monitoring component allows user input to the one or more applications based upon a triggering event of the one or more applications.

9. The at least one computer readable storage medium of claim 1, wherein the security curtain application comprises a windows scripting host for providing a hypertext markup language page adapted for preventing the user from interrupting the operation of the one or more applications.

10. The at least one computer readable storage medium of claim 1, wherein the one or more applications comprises a call center dashboard (CCDB) application, adapted for conducting operations associated with a call center business.

11. The at least one computer readable storage medium of claim 1, wherein the security curtain application provides a splash screen to the computer to prevent interruption of the operation of the application.

12. The at least one computer readable storage medium of claim 11, wherein the splash screen is located in a web browser window.

13. The at least one computer readable storage medium of claim 11, wherein the splash screen comprises video.

14. The at least one computer readable storage medium of claim 11, wherein the splash screen comprises text.

15. The at least one computer readable storage medium of claim 11, wherein the splash screen comprises a graphics image.

16. The at least one computer readable storage medium of claim 11, wherein the splash screen comprises a graphical blank white screen.

17. A method, implemented by at least one processor, of preventing interruption by a user of a script launching at least one application, the method comprising:
 running, by a processor, the script that launches the at least one application on the user's computer; and
 launching, by a processor, a security curtain application adapted to prevent user input from interrupting the applications being launched by the script, wherein the security curtain application further comprises a monitoring component adapted to control when the user may provide input to the at least one application during the operation of the script.

18. The method of claim 17, wherein the running of the script comprises a graphical user interface entry that simulates user keyboard input into requestor windows.

19. The method of claim 17, wherein at least one application requires user login information, the method further includes:
 the script automatically providing user login information during launch of the at least one application; and
 the secure curtain application preventing user input from interfering with the login information being provided to the at least one application.

* * * * *